(12) United States Patent
Lee et al.

(10) Patent No.: US 12,453,462 B2
(45) Date of Patent: Oct. 28, 2025

(54) SYSTEM FOR OBTAINING RELIABILITY DATA USING MULTI-ANGLE SCANNING, AND METHOD USING SAME

(71) Applicant: MEDIT CORP., Seoul (KR)

(72) Inventors: Dong Hoon Lee, Seoul (KR); Dong Hwa Kang, Seoul (KR)

(73) Assignee: MEDIT CORP., Seoul (KR)

( * ) Notice: Subject to any disclaimer, the term of this patent is extended or adjusted under 35 U.S.C. 154(b) by 372 days.

(21) Appl. No.: 18/019,552

(22) PCT Filed: Aug. 6, 2021

(86) PCT No.: PCT/KR2021/010403
§ 371 (c)(1),
(2) Date: Feb. 3, 2023

(87) PCT Pub. No.: WO2022/031105
PCT Pub. Date: Feb. 10, 2022

(65) Prior Publication Data
US 2023/0284882 A1    Sep. 14, 2023

(30) Foreign Application Priority Data
Aug. 6, 2020  (KR) ........................ 10-2020-0098783

(51) Int. Cl.
*A61B 1/00*    (2006.01)
*A61B 1/24*    (2006.01)
(Continued)

(52) U.S. Cl.
CPC .... *A61B 1/00172* (2013.01); *A61B 1/000094* (2022.02); *A61B 1/24* (2013.01);
(Continued)

(58) Field of Classification Search
CPC ..... G06T 17/00; G06T 19/20; G06T 2200/24; G06T 2219/2004; G06T 2219/2012;
(Continued)

(56) References Cited

U.S. PATENT DOCUMENTS

| 2003/0096210 A1 | 5/2003 | Rubbert et al. |
| 2006/0212260 A1* | 9/2006 | Kopelman ............. G16H 50/50 |
| | | 702/152 |

(Continued)

FOREIGN PATENT DOCUMENTS

| KR | 10-2015-0082428 A | 7/2015 |
| KR | 10-1613159 B1 | 4/2016 |

(Continued)

OTHER PUBLICATIONS

Extended European Search Report issued Jul. 15, 2024 in European Application No. 21854069.8.
(Continued)

*Primary Examiner* — Daniel F Hajnik
*Assistant Examiner* — Jed-Justin Imperial
(74) *Attorney, Agent, or Firm* — Sughrue Mion, PLLC

(57) ABSTRACT

A reliability data obtaining system and method using multi-angle scanning includes a scanner configured to scan an object at multi-angles and a controller configured to generate and align real-time three-dimensional (3D) surfaces based on a plurality of pieces of data obtained from the scanner and assign characteristic information to unit cells included in the real-time 3D surfaces obtained via multi-angle scanning. The characteristic information may include a resource density, a curve of an object, an object color, a reliability color, position information, etc. According to the disclosure, a degree of accumulation of the resource density may be limited according to the position information so that data having various angle ranges may be accumulated in each
(Continued)

unit cell. Thus, an intraoral model having minimized data distortion and having high reliability may be obtained.

16 Claims, 12 Drawing Sheets

(51) Int. Cl.
*A61C 13/34* (2006.01)
*G06T 17/00* (2006.01)
*G06T 19/20* (2011.01)

(52) U.S. Cl.
CPC .............. *A61C 13/34* (2013.01); *G06T 17/00* (2013.01); *G06T 19/20* (2013.01); *G06T 2200/24* (2013.01); *G06T 2210/41* (2013.01); *G06T 2219/2004* (2013.01); *G06T 2219/2012* (2013.01)

(58) Field of Classification Search
CPC . A61B 1/00172; A61B 1/000094; A61B 1/24; A61C 13/34
See application file for complete search history.

(56) References Cited

U.S. PATENT DOCUMENTS

| | | |
|---|---|---|
| 2008/0199829 A1 | 8/2008 | Paley et al. |
| 2014/0120493 A1 | 5/2014 | Levin |
| 2015/0178908 A1 | 6/2015 | Jesenko et al. |
| 2016/0239631 A1* | 8/2016 | Wu .......................... G16Z 99/00 |
| 2019/0231491 A1 | 8/2019 | Sabina et al. |
| 2020/0000553 A1* | 1/2020 | Makarenkova ........ A61C 7/002 |
| 2020/0265653 A1* | 8/2020 | Hawkins ................. G06T 7/521 |
| 2020/0404243 A1* | 12/2020 | Saphier .................. A61C 9/006 |
| 2022/0079717 A1 | 3/2022 | Cho et al. |

FOREIGN PATENT DOCUMENTS

| | | |
|---|---|---|
| KR | 10-2018-0125793 A | 11/2018 |
| KR | 10-2096612 B1 | 4/2020 |
| WO | 2018/022940 A1 | 2/2018 |
| WO | 2019/220212 A2 | 11/2019 |
| WO | 2020/058758 A1 | 3/2020 |

OTHER PUBLICATIONS

Bruno Nehme Barbo, et al., "Digital Models: Comparison of Scanning Angulations and Superimposition", Open Journal of Stomatology, Aug. 3, 2020, pp. 218-229, vol. 10.
Riccardo Favero, et al., "Accuracy of 3D digital modeling of dental arches", Dental Press J. Orthod. Jan.-Feb. 2019, pp. 38.e1-38.e7, vol. 24, No. 1.
International Search Report for PCT/KR2021/010403 dated Nov. 11, 2021 [PCT/ISA/210].
Written Decision on Registration for KR 10-2020-0098783 dated Sep. 5, 2022.
Request for the Submission of an Opinion for KR 10-2020-0098783 dated Aug. 6, 2020.

* cited by examiner

SYSTEM FOR OBTAINING RELIABILITY DATA USING MULTI-ANGLE SCANNING, AND METHOD USING SAME

CROSS REFERENCE TO RELATED APPLICATIONS

This application is a National Stage of International Application No. PCT/KR2021/010403 filed Aug. 6, 2021, claiming priority based on Korean Patent Application No. 10-2020-0098783 filed Aug. 6, 2020.

TECHNICAL FIELD

The disclosure relates to a system for obtaining reliability data by using multi-angle scanning and a method using the system.

BACKGROUND ART

As a method of obtaining oral cavity information of a patient, a three-dimensional intraoral scanner which is input to an oral cavity of the patient to generate a three-dimensional virtual model has been frequently used. Also, a three-dimensional table scanner configured to generate a three-dimensional virtual model with respect to a plaster model obtained by performing alginate impression taking with respect to a tooth of a patient has been continually used. As described above, the three-dimensional virtual model obtained through a three-dimensional scanner (including the intraoral scanner and the table scanner) includes upper jaw scan data, lower jaw scan data, and occlusal scan data of a patient, and with respect to a tooth requiring treatment, a tooth restoration, such as a crown, etc., may be manufactured through modelling using a computer-aided design (CAD) program.

In general, the three-dimensional scanner may obtain a two-dimensional image through a light projector and a camera unit that are included in the scanner, the light projector being configured to irradiate predetermined light to an object (an oral cavity including a tooth and the gum or a plaster model) to be scanned and the camera unit being configured to receive light reflected from a surface of the object after being irradiated to the object from the light projector. Thereafter, the three-dimensional scanner may finally generate and display a three-dimensional intraoral model. However, when data obtained through the light received in the process of generating the three-dimensional intraoral model is unlimitedly accumulated, a lot of system resources may have to be used in a process of finally aligning and merging data to cause inconvenience. This inefficient use of system resources may disrupt a rapid completion of the three-dimensional intraoral model, and when wrong data, such as a soft issue, etc., is obtained, the reliability of the three-dimensional intraoral model may not be guaranteed.

DISCLOSURE

Technical Problem

The objective of the disclosure is to provide a reliability data obtaining system for obtaining digital data having high reliability by using multi-angle scanning.

Also, another objective of the disclosure is to provide a reliability data obtaining method for obtaining digital data having high reliability by scanning, via the reliability data obtaining system described above, an object at various angles.

The technical objectives of the disclosure are not limited to the ones described above, and other technical objectives not mentioned may be clearly understood by one of ordinary skill in the art from the following descriptions.

Technical Solution

In order to accomplish the objectives described above, a reliability data obtaining system according to the disclosure includes a scanner configured to irradiate light toward an object to be scanned, by orienting the light in two or more angle ranges, and receive light reflected from the object and a controller configured to process a plurality of pieces of data obtained from the light received by the scanner to be displayed on a user interface as real-time three-dimensional (3D) surfaces and change characteristics of the real-time 3D surfaces according to a scan angle of the real-time 3D surfaces.

Also, the controller may be further configured to generate a 3D intraoral model by merging the real-time 3D surfaces.

Also, the controller may include a 3D data generator configured to convert the data obtained from the scanner into a form of the real-time 3D surfaces, an aligner configured to align the real-time 3D surfaces, a characteristic assigner configured to assign characteristic information to the real-time 3D surfaces, and a scan angle calculator configured to calculate a scan angle at which the scanner scans the object.

Also, the data obtained from the scanner may include one or more unit cells.

Also, the unit cells may be a voxel having a volume, and the unit cells may include at least one from the characteristic information including a resource density, a curve, an object color, a reliability color, and position information.

Also, the scan angle calculator may be configured to calculate a movement distance and a movement angle from a coordinate deviation of the scanner.

Also, the scan angle may include at least two angle elements including a first rotation direction and a second rotation direction.

Also, the movement distance may be represented in a form of an orthogonal coordinate system.

Also, the controller further may include a corresponding point determiner configured to determine, with respect to the unit cells of the aligned real-time 3D surfaces, whether or not the characteristic information is less than a threshold value, and to selectively update the characteristic information of the unit cells.

Also, the corresponding point determiner may be configured to identify the characteristic information of the unit cells corresponding to parts of the real-time 3D surfaces, the parts being aligned to overlap each other.

Also, the characteristic information identified by the corresponding point determiner may correspond to at least one of the resource density or the scan angle.

Also, when the scan angle assigned to the unit cells corresponds to a predetermined angle range, and the resource density corresponds to a predetermined resource density value, the data obtained from the scanner may not be stored in the unit cells.

Also, when the resource density corresponds to a threshold value, the data obtained from the scanner may not be stored in the corresponding unit cells.

Also, the characteristic assigner may be configured to assign at least one piece of update limit information according to the scan angle and the resource density assigned to the unit cells.

Also, when the update limit information is assigned to the unit cells, the corresponding point determiner may be configured not to store the data obtained from the scanner in the unit cells.

A reliability data obtaining method according to the disclosure includes a scanning operation in which at least one piece of image data is, at different angles, obtained from an object to be scanned by a scanner, a real-time three-dimensional (3D) surfaces generation operation in which the image data obtained in the scanning operation is converted into a form of real-time 3D surfaces, an aligning operation in which the real-time 3D surfaces are aligned, and a characteristic information updating operation in which characteristic information assigned to the real-time 3D surfaces is identified, and according to whether or not the characteristic information corresponds to a threshold condition, the characteristic information of the real-time 3D surfaces is selectively updated.

Also, the real-time 3D surfaces may include one or more unit cells.

Also, the characteristic information may be assigned to the unit cells, wherein the characteristic information may include at least one of position information, a scan angle, a resource density, an object color, a curve, and a reliability color.

Also, the characteristic information updating operation may include, with respect to the unit cells, an angle range identifying operation in which an angle range to which the scan angle corresponds is identified, a resource density identifying operation in which the resource density accumulated in the angle range is identified, and a characteristic information adding operation in which, when the resource density is less than a threshold value, the resource density is updated with respect to the corresponding unit cells.

Also, the scan angle may be obtained by applying a movement angle based on a point at which the scanning operation is started, wherein the movement angle may have at least two angle elements including a first rotation direction and a second rotation direction.

Also, the threshold value of the resource density may be predetermined to correspond to the angle range, and the resource density accumulated according to the angle range may denote a reliability of the unit cells.

Also, the reliability color may be assigned as at least two colors according to a size of the resource density.

Advantageous Effects

By using a reliability data obtaining system and method according to the disclosure, data may be input such that a resource density may be accumulated to a predetermined extent at a plurality of angle ranges. Accordingly, data obtained by scanning the same point at multi-angles may be accumulated, and thus, data distortion may be minimized, and the data reliability may be increased.

EXPLANATION OF REFERENCE NUMERALS DESIGNATING THE MAJOR ELEMENTS OF THE DRAWINGS

Figure 1:
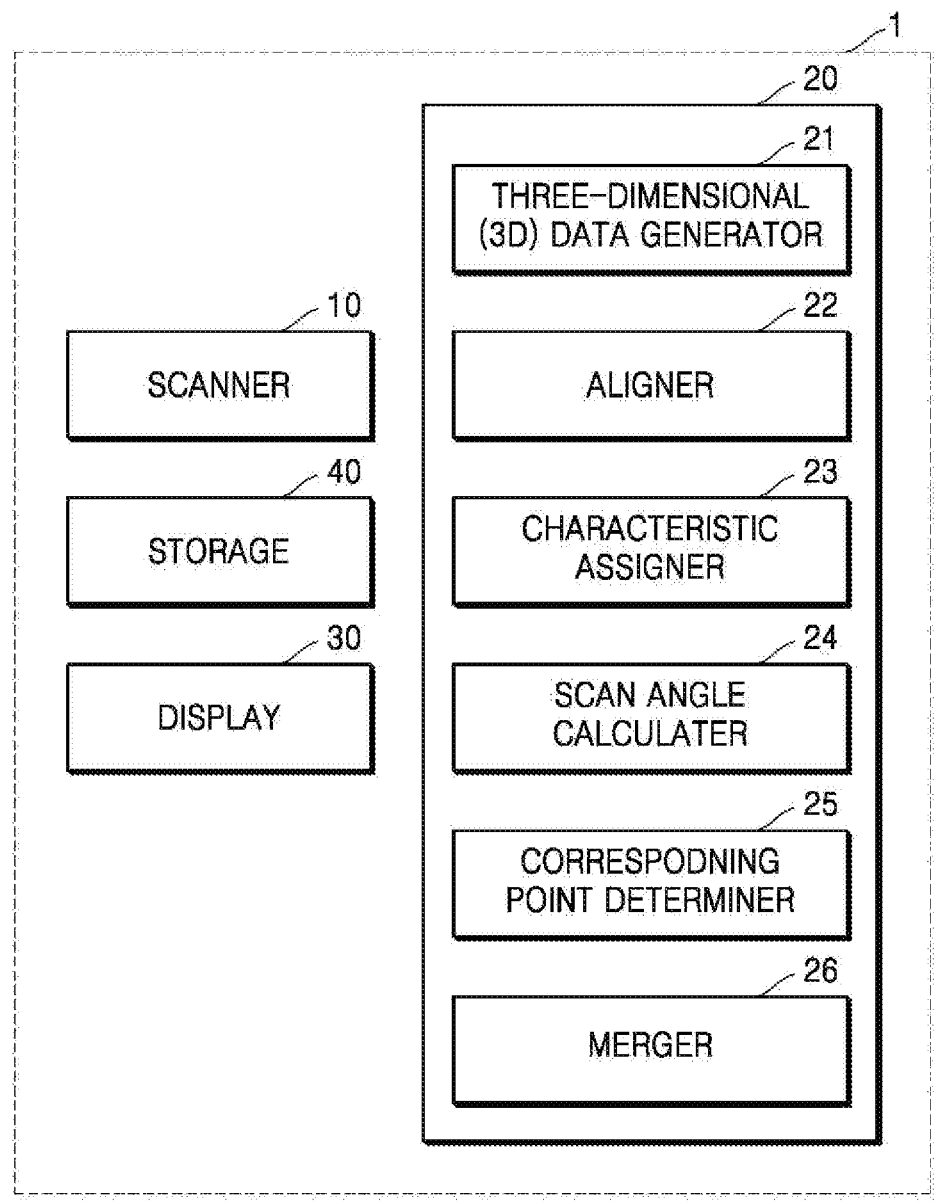
FIG. 1 is a schematic diagram of components of a reliability data obtaining system according to the disclosure.

1: reliability data obtaining system 10: scanner
20: controller
21: three-dimensional data generator
22: aligner
23: characteristic assigner
24: scan angle calculator
25: corresponding point determiner
26: merger
30: display
40: storage
M: object
sc1: first scan area
sc2: second scan area
sc3: third scan area
L: first rotation direction
F: second rotation direction
C1: first scan point
C2: second scan point
C3: third scan point
T1: first scan plane
T2: second scan plane
T3: third scan plane
θ1: first angle range
θ2: second angle range
θ3: third angle range
M': real-time three-dimensional surfaces
140a: model display area
140b: real time display area
160: scan area
RD1: first reliability color
RD2: second reliability color
RD3: third reliability color (threshold color)
S1: scanning operation
S2: three-dimensional model generating operation
S3: aligning operation
S4: characteristic information updating operation
S41: angle range identifying operation
S42: resource density identifying operation
S43: characteristic information adding operation
S5: merging operation

BEST MODE

Hereinafter, one or more embodiments of the disclosure are described in detail with reference to example drawings. It should be noted that like reference numerals are assigned to components of each drawing as possible, when the components of each different drawing are the same. Also, in describing an embodiment of the disclosure, when detailed descriptions about related known configurations or functions are determined to undermine the understanding with respect to the embodiment of the disclosure, the detailed descriptions are omitted.

In describing components of an embodiment of the disclosure, terms such as first, second, A, B, (a), (b), etc. may be used. These terms are used only to distinguish corresponding components from other components, and the essence, sequence, or order of the components is not limited by the terms. Also, unless otherwise defined, all of the terms used herein including the technical or scientific terms have the same meaning as generally understood by one of ordinary skill in the art. The terms the same as the ones defined in generally used dictionaries should be interpreted to have the meaning in the context of the related technology and should not be interpreted to have an ideal or excessively formal meaning, unless clearly defined so in this application.

Figure 2:
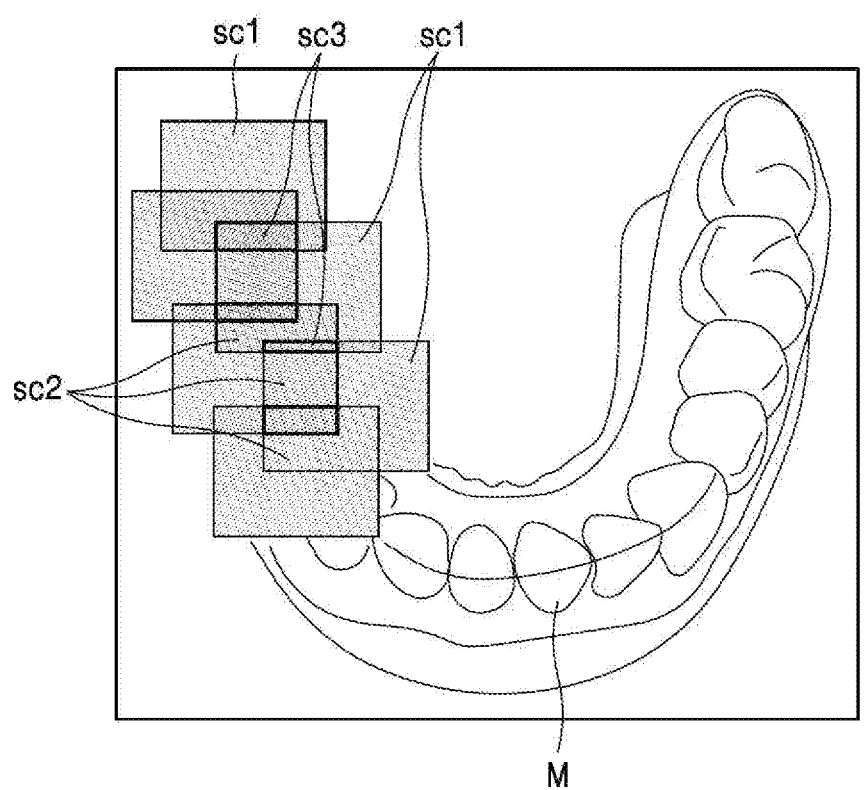
FIG. 2 is a reference diagram for describing a degree of data accumulation according to a plurality of scan ranges, for describing a reliability data obtaining system according to the disclosure.

FIG. 1 is a schematic structural diagram of a reliability data obtaining system according to the disclosure, and FIG. 2 is a reference diagram for describing a degree of data accumulation according to a plurality of scan ranges, in order to describe the reliability data obtaining system according to the disclosure.

Referring to FIGS. 1 and 2, the reliability data obtaining system according to the disclosure may include a scanner configured to irradiate light oriented toward an object to be scanned at two or more angle ranges and receive light reflected from the object, and a controller configured to process a plurality of pieces of data obtained from the light received by the scanner to be displayed, in the form of real-time three-dimensional (3D) surfaces, on a user interface and change a characteristic of the real-time 3D surfaces according to scan angles of the real-time 3D surfaces.

The scanner 10 may include an intraoral scanner configured to scan an oral cavity of a patient by using a hand of a practitioner or scan a plaster model obtained via impression taking, or a table scanner configured to scan the plaster model arranged on a tray. The scanner 10 may include at least one camera, and light received through this camera may be analyzed to generate a two-dimensional (2D) image. The 2D image may be generated by an imaging sensor electrically communication-connected with the camera. For example, a complementary metal-oxide semiconductor (CMOS) sensor may correspond to the imaging sensor.

The scanner 10 may include a light projector to obtain 3D information required to convert the 2D image to the real-time 3D surfaces. The light projector may irradiate light toward an object so that light reflected from the object may be received by the camera formed in the scanner 10. The light irradiated from the light projector toward the object may be structure light having a predetermined pattern, and the pattern of the structure light may be regular or variable such that a predetermined rule circulates.

FIG. 2 illustrates a scanning operation performed from an end of an object to another end of the object. When the 2D image data is obtained from the scanner 10, a 3D data generator 21 of the controller 20 may convert the data into real-time 3D surfaces including one or more unit cells. Here, the real-time 3D surfaces may have the form of 3D surfaces represented on a user interface, and the unit cells included in the real-time 3D surfaces may represent the surfaces of the object. In more detail, the unit cells included in the real-time 3D surfaces may be voxels a having volume like 3D pixels, and the unit cells may include at least one of various pieces of characteristic information. Here, the characteristic information may include a resource density, a curve, an object color, a reliability color, update limit information, position information, etc.

It is described above that the scanning operation of the scanner 10 is performed from an end of the object to the other end of the object. However, the scanning operation is not necessarily performed from an end to the other end. The scanning operation may be performed from the center toward both side surfaces. In the case of the table scanner, the real-time 3D surfaces may be generated by rotating or tilting an object M within a range in which overlapping scan areas are formed.

In FIG. 2, when the scan areas overlap each other when the object M is scanned, a greater amount of resources may be accumulated. For example, when a scanning operation is performed on six areas as illustrated, and when data of the object M is obtained based on one scan area, the scan area may correspond to a first scan area sc1, and when data of the object M is obtained based on two scan areas, the scan areas may correspond to a second scan area sc2. Also, when data of the object M is obtained based on three scan areas, the scan areas may correspond to a third scan area sc3. From the first scan area sc1 toward the third scan area sc3, a data accumulation degree (referred to as a resource density, in this specification) may be increased.

In more detail, the resource density of the characteristic information described above may denote the data accumulation degree corresponding to a corresponding unit cell, and as the resource density is increased, the amount of data accumulation corresponding to a scanning operation may be increased, and thus, the reliability may be increased. With respect to the characteristic information in addition to the resource density, the curve and the object color may correspond to surface information about the object and may have information for authentically representing the real-time 3D surfaces on the user interface. The reliability color may be an index indicating an accuracy (or a reliability) of data included in the unit cell, and the reliability color information may be assigned to correspond to a size of the resource density. Here, the reliability color information may be divided into two or more colors and assigned to correspond to the size of the resource density. Here, the assigning of the characteristic information may be performed by a characteristic assigner 23 included in the controller 20, and the assigning of the characteristic information by the characteristic assigner 23 may be performed after the characteristic information of the unit cell is identified by a corresponding point determiner 25. The determining of the characteristic information by the corresponding point determiner 26 will be described below.

Figure 3:
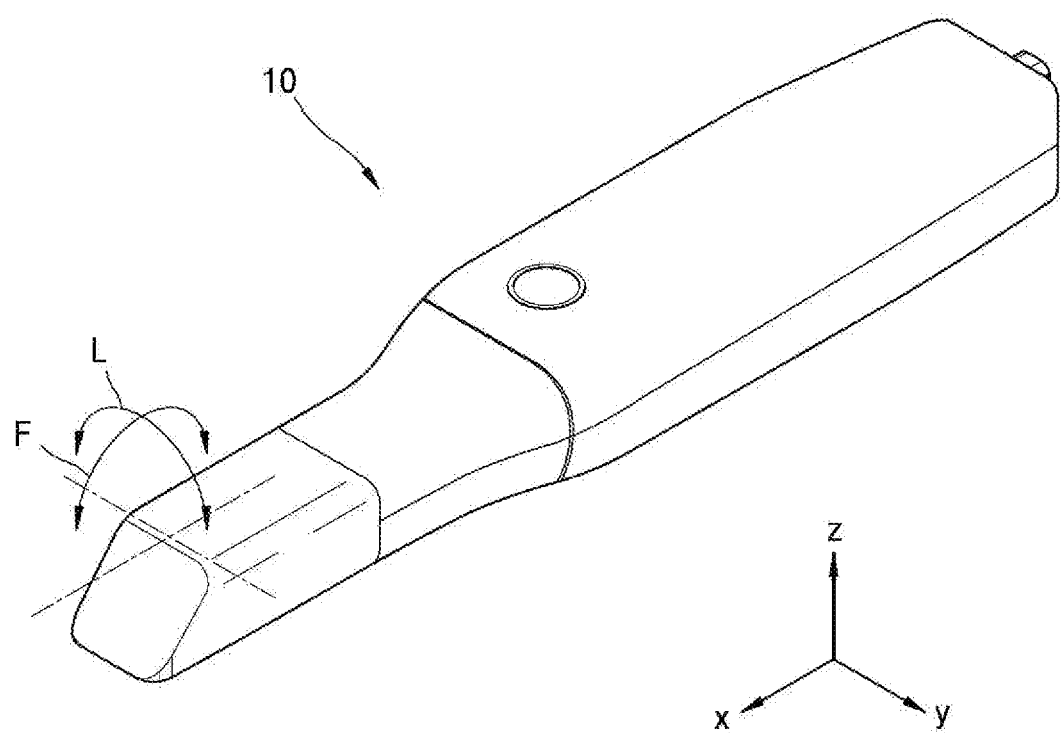
FIG. 3 is a reference diagram for describing a rotation direction of a scanner, in a reliability data obtaining system according to the disclosure.
Figure 4:
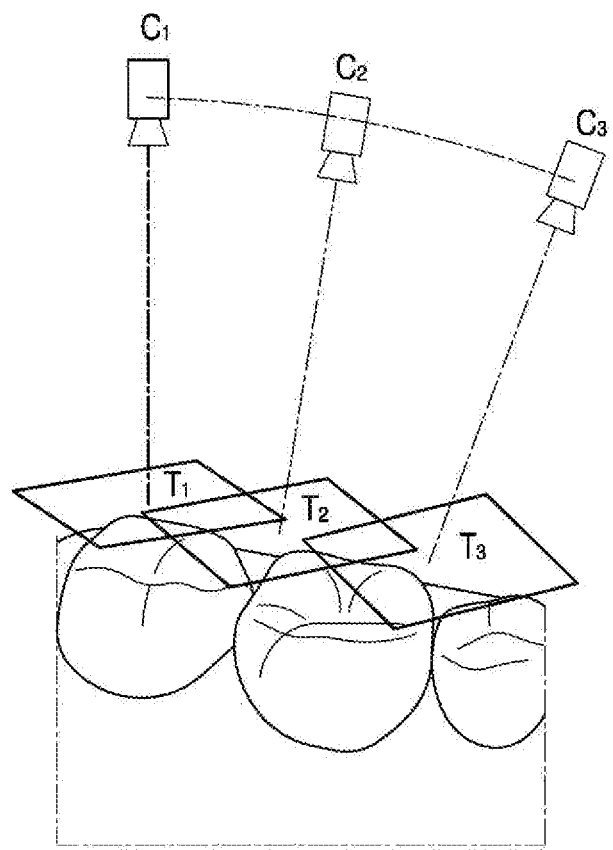
FIG. 4 is a reference diagram for describing a scan plane according to a movement of a scanner, in a reliability data obtaining system according to the disclosure.
Figure 5:
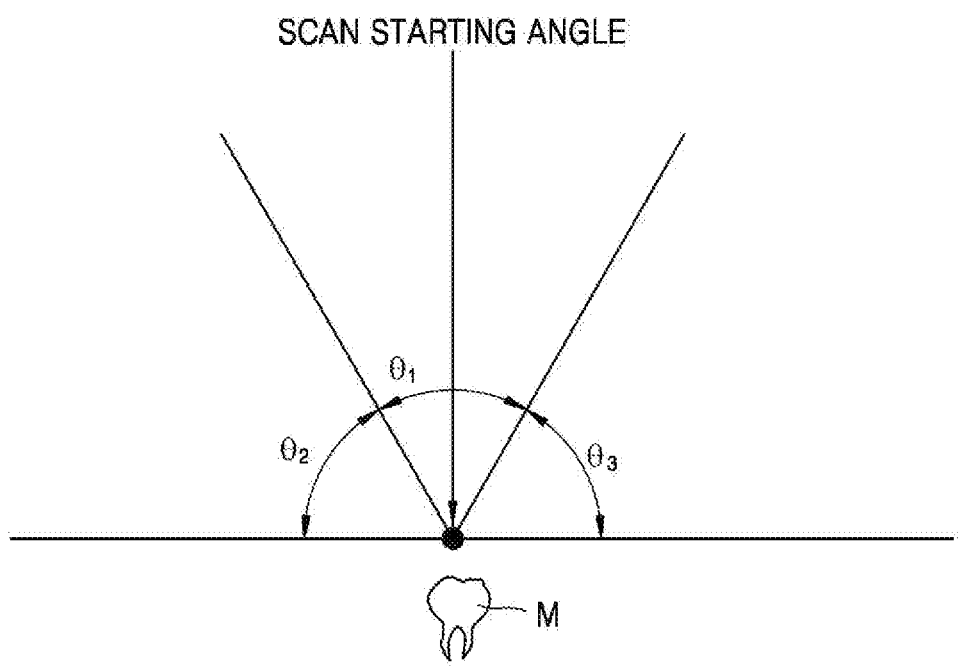
FIG. 5 is a reference diagram for describing a scan angle with respect to an object of a scanner, in a reliability data obtaining system according to the disclosure.

FIG. 3 is a reference diagram for describing a rotation direction of the scanner in the reliability data obtaining system according to the disclosure, FIG. 4 is a reference diagram for describing a scan plane according to a movement of the scanner in the reliability data obtaining system according to the disclosure, and FIG. 5 is a reference diagram for describing a scan angle of the scanner with respect to an object in the reliability data obtaining system according to the disclosure.

Referring to FIGS. 3 and 4, an example of a hand-held type intraoral scanner which may be used as the scanner 10 is illustrated. When the intraoral scanner is used as the scanner 10, a practitioner may grasp the scanner 10 and scan an object to be scanned, at a desired angle and distance according to the will of the practitioner. With respect to a parallel movement of the scanner 10, the scanner 10 may move in a direction based on a combination of x, y, and z directions, and the scanner 10 may rotate in a direction based on a combination of a first rotation direction (a rotation direction L) having a lengthwise direction (an x direction) of the scanner 10 as an axis, a second rotation direction (a rotation direction F) having a width direction (a y direction) as an axis, and a third rotation direction (not shown) having a height direction (a z direction) as an axis.

As illustrated in FIG. 3, the object may be scanned at various angles by rotating the scanner 10 in the first rotation direction L and the second rotation direction F. According to a change of the scan angle of the object, a plurality of pieces of information may be input with respect to the same point of the object.

Also, as illustrated in FIG. 4, when the scanning operation on the object is performed by the camera provided in the scanner 10, a first scan plane T1, a second scan plane T2, and a third scan plane T3 that are virtual may be formed on surfaces of the object according to a first scan point C1, a second scan point C2, and a third scan point C3, respectively, and the first to third scan planes T1 to T3 may overlap each other so that the one or more unit cells included in the real-time 3D surfaces may overlap each other after the real-time 3D surfaces are formed.

In order to generate intraoral model data from the generated real-time 3D surfaces as described above, an aligner 22 may align the unit cells in the plurality of real-time 3D surfaces to overlap each other. Here, a method of aligning the real-time 3D surfaces may include any one of various methods of aligning digital data. However, desirably, the aligning of the real-time 3D surfaces may be performed by using an iterative closest point (ICP) method.

By aligning the real-time 3D surfaces by using the ICP method, the position information and the scan angle may be automatically obtained. For example, a position of the scanner 10 may correspond to a relative position, a coordinate of an initial position at which a scanning operation is started may be set as a starting point (0, 0, 0), and based on the starting point, how much the scanner 10 is moved may be indicated. The position information of the scanner 10 may be measured as a movement distance through a coordinate deviation and may be used for the aligning of the real-time 3D surfaces. In order to indicate the position information, an (x, y, z) orthogonal coordinate system may be used. However, it is not limited thereto, and various coordinate representation forms indicating positions may be used, including, for example, an (r, θ, φ) cylindrical coordinate system. Likewise, as the position information of the scanner 10 is obtained according to the movement distance based on the coordinate deviation, the scan angle of the scanner 10 may also be calculated and obtained by calculating a deviation according to a movement angle. The obtaining of the scan angle may be performed by a scan angle calculator 24 included in the controller 20.

The scanner 10 may continually collect data of the real-time 3D surfaces. Here, when two or more pieces of data of the real-time 3D surfaces are collected, a relationship between the pieces of data of the real-time 3D surfaces may be derived. To derive the relationship between the pieces of data of the real-time 3D surfaces, a plurality of vertexes may be extracted from one piece of data of the real-time 3D surfaces, and a plurality of corresponding points corresponding to the plurality of vertexes may be calculated from other pieces of data of the real-time 3D surfaces, to calculate a movement function with respect to the other pieces of data of the real-time 3D surfaces based on the original piece of data of the real-time 3D surfaces and perform data alignment via an angle change and movement. Here, a relative position (position information) and a scan angle (angle information) of the other pieces of data of the real-time 3D surfaces may be obtained based on the original piece of data of the real-time 3D surfaces. When the scanner 10 uses two or more cameras, different scan angles may be implemented even when a scanning operation is performed with respect to an identical 3D position, and the position information and the scan angle may be obtained through an angle deviation between a reference camera and other cameras.

The obtaining of the movement distance and the movement angle described above may also be performed by a gyro sensor included in the scanner 10. The gyro sensor may include a 6-axis gyro sensor configured to sense a movement and rotation or may include various devices configured to obtain the position information and the scan angle. The scan angle may be represented as ($\alpha$, $\beta$, $\gamma$), and depending on cases, may also be represented as (x, y, z, $\alpha$, $\beta$, $\gamma$) together with the position information.

As described above, the movement angle required to be obtained in order to obtain the scan angle may include two or more angle elements. Desirably, the movement angle may include the angle elements with respect to the first rotation direction L based on the x axis, the second rotation direction F based on the y axis, and the third rotation direction (not shown) based on the z axis. However, it is desirable to obtain at least two angle elements in order to obtain the intraoral model having high reliability via multi-angle scanning of an object, and for example, the angle element of the first rotation direction L and the angle element of the second rotation direction F may be obtained.

Referring to FIG. 5, a starting position and angle at which the scanning operation of the scanner 10 is performed on the object may be set as a reference position and angle. For example, the point at which the scanning operation by the scanner 10 is started to be performed may correspond to a point (0, 0, 0) and an angle (0, 0, 0). When the object is scanned, a relative position and a relative angle may be obtained from a reference position and a reference angle, respectively, according to a movement distance and a movement angle sensed by the gyro sensor included in the scanner 10. Here, a first angle range $\theta 1$ may be set based on the reference angle. When the initial scanning operation is performed and obtained real-time 3D surfaces have a scan angle in the first angle range, characteristic information up to a first reference may be accumulated. Even when a minute angle change occurs in the first angle range, a drastic change of the characteristic information may not occur. Thus, the characteristic information of a unit cell included in the real-time 3D surfaces obtained within the first angle range may be equally treated. When the characteristic information up to the first reference is accumulated, updating of the characteristic information of the unit cell may be limited in order that new characteristic information is not additionally input to the unit cell.

When the scan angle has a scan angle in a second angle range (For example, $\theta 2$) beyond the first angle range $\theta 1$, the characteristic information up to a second reference may be accumulated. When the characteristic information up to the first reference is accumulated in the first angle range $\theta 1$ with respect to the unit cell of an identical point, and data of the real-time 3D surfaces having the second angle range θ2 is input, the characteristic information may be updated to accumulate the characteristic information in the corresponding unit cell.

As illustrated in FIG. 5, a straight angle of 180° may be formed based on an object M, and the angle may have arbitrary first to third angle ranges θ1, θ2, θ3. However, the disclosure is not limited thereto, and according to the need of a user, a maximum angle range, the number of measurement angle ranges, and a range angle may be changed. For example, the maximum angle range in which the measurement may be performed may be set as −15° to +15° from the reference angle, −5° to +5° may be set as the first angle range, −15° to −5° may be set as the second angle range, and +5° to +15° may be set as the third angle range. This may be changed according to the necessity of the user, and for example, one or more angle ranges may be symmetrically set, when the reference angle is 0°.

Figure 6:
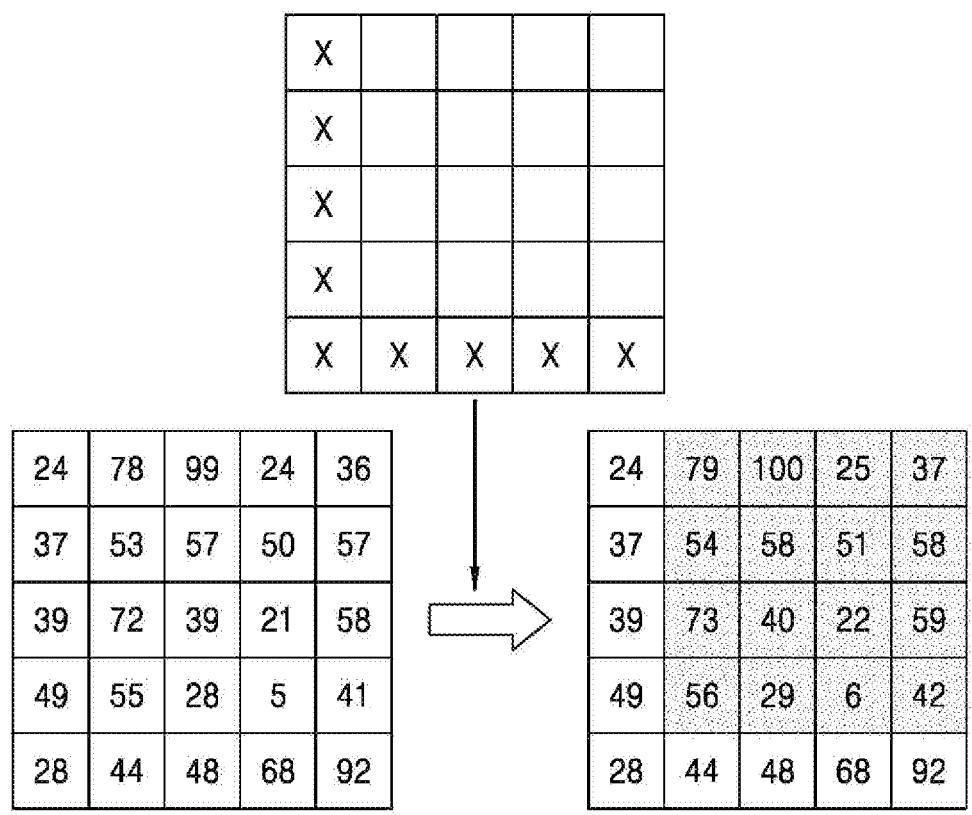
FIGS. 6 to 8 are diagrams for describing a process in which characteristic information is updated when data is input to a corresponding unit cell, in order to describe a reliability data obtaining system according to the disclosure.
Figure 7:
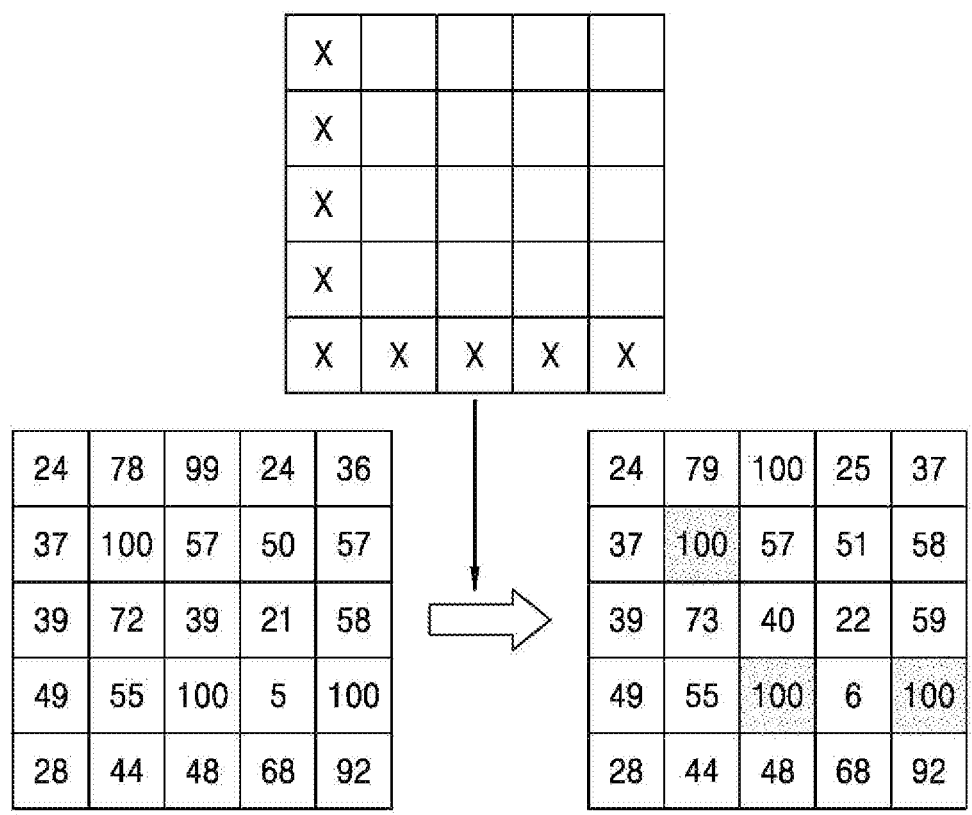
Figure 8:
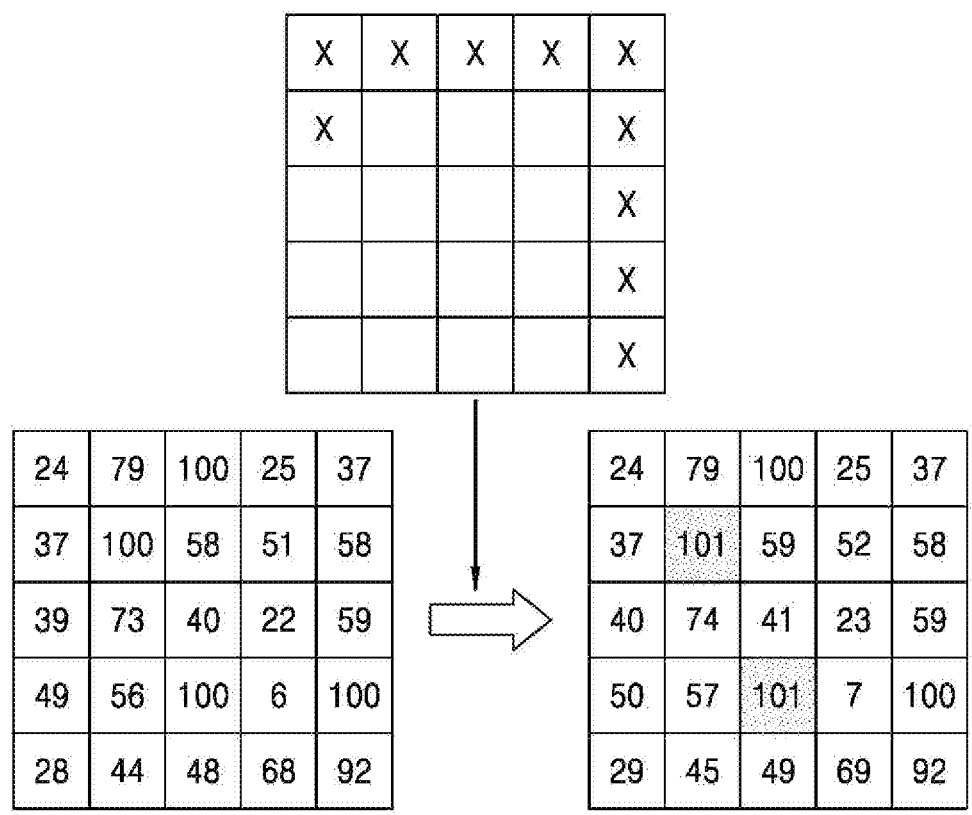

FIGS. 6 to 8 are diagrams for describing a process of updating characteristic information when data is input to a corresponding unit cell, in order to describe a reliability data obtaining system according to the disclosure. For example, the resource density for maximum storage in one angle range is set as 100. However, this may be changed for obtaining highly reliable data or according to the need of the user.

Referring to FIG. 6, arbitrary real-time 3D surfaces are illustrated on the left side in order to describe the reliability data obtaining system according to the disclosure. The real-time 3D surfaces may include one or more unit cells. For example, the real-time 3D surfaces having the total of 5×5 unit cells, that is, 25 unit cells, are illustrated. Also, it is assumed that with respect to the real-time 3D surfaces illustrated in FIG. 6, characteristic information data is accumulated and stored in the same angle range for each unit cell. New real-time 3D surfaces may be generated according to a scanning operation by the scanner 10, and after corresponding unit cells are aligned to overlap each other, the corresponding point determiner 25 of the controller 20 may determine whether or not the characteristic information included in the aligned unit cells of the real-time 3D surfaces is less than a threshold value, and the characteristic information may be selectively updated.

In the real-time 3D surfaces newly input, a portion indicated as "X" may correspond to a portion not overlapping the previous real-time 3D surfaces. Thus, the characteristic information of unit cells corresponding to 4×4 at an upper right end of the newly input real-time 3D surfaces may be identified. Here, desirably, the identified characteristic information may include at least one of a resource density and a scan angle. As illustrated in FIG. 6 as an example of a value of the resource density, whether or not the resource density of the unit cell of the previous real-time 3D surfaces corresponds to a threshold value may be identified, and when the resource density is less than the threshold value, the resource density of the unit cell may be updated. The shaded part of FIG. 6 indicates that the resource density is added and updated.

Referring to FIG. 7, some of the unit cells of the real-time 3D surfaces have an accumulated resource density of up to 100, which is a first reference resource density value, in the first angle range. Here, the new real-time 3D surfaces may be generated by the scanning operation by the scanner 10 and may be aligned to correspond to each unit cell. Thereafter, whether or not to update the characteristic information of each unit cell may be determined. As illustrated, the unit cell in which the resource density reaches 100 in the first angle range may not store the characteristic information (data) of a corresponding unit cell in the same angle range obtained from the scanner 10. The resource density in a shaded part of FIG. 7 may correspond to a predetermined first reference resource density, and thus, it is shown that the characteristic information of the corresponding unit cell may not be updated, and the characteristic information of the other unit cells may be updated. As described above, an upper limit value to which the resource density is accumulated in the same angle range may be designated in order to limit the additional data accumulation beyond this limit. Thus, unnecessary occupancy of a storage or use of a system resource may be minimized.

Referring to FIG. 8, the scanner 10 may perform an updating operation of the characteristic information on the unit cell through real-time 3D surfaces obtained in a second angle range different from the first angle range. Even when the first reference resource density is reached in the first angle range, the characteristic information of the corresponding unit cell in the second angle range may be different, and through the updating of the characteristic information, highly reliable data may be obtained with respect to each unit cell, and as a result, an intraoral model having high reliability may be obtained. Thus, after new real-time 3D surfaces obtained in the second angle range are aligned with the unit cells corresponding to the previous real-time 3D surfaces, the characteristic information newly input may be updated in the corresponding unit cell. In a shaded part of FIG. 8, the resource density before the updating may correspond to the first reference resource density, but the characteristic information input in the second angle range may be accumulated to add the resource density of the unit cell. As described above, by accumulating and updating the characteristic information up to a predetermined reference value at various angle ranges, characteristic information of a corresponding point scanned at various angle ranges may be stored in each unit cell, and thus, data distortion may be prevented, and a more precise intraoral model may be obtained.

A process of accumulating the resource density in the same angle range and/or different angle ranges is to be described with a more specific example.

For example, the first angle range may be −30° to +30° including the reference angle 0°, the second angle range may be −90° to −30°, and the third angle range may be +30° to +90°. Also, each of the first angle range, the second angle range, and the third angle range may have a threshold resource density of 100. That is, the threshold final resource density at which it may be determined that data having sufficient reliability is obtained with respect to the same point may be 300.

When a user starts scanning through the scanner 10 in the first angle range, image data included in the first angle range may be accumulated as the resource density. Here, a process of accumulating the resource density may be performed such that positions of data are aligned and the characteristic information is updated for each unit cell. For example, in the first angle range, the resource density may be accumulated to 100, which is the first reference. Even when additional image data is obtained in the first angle range after the resource density is accumulated to 100 in the first angle range, the scanner 10 may not update the characteristic information according to the additional image data, in the case of a unit cell having the resource density reaching the first reference.

Thereafter, when the user scans a predetermined point of the object in the second angle range, the resource density may be accumulated to a threshold resource density in the second angle range. For example, when the resource density of 100 is accumulated in the first angle range with respect to a predetermined unit cell, the resource density of 100 may be additionally accumulated in the second angle range with respect to the same unit cell, and thus, the resource density may be accumulated to a second reference (the resource density of 200). Likewise, even when additional image data is obtained in the second angle range after the resource density of 100 is additionally accumulated in the second angle range, the scanner 10 may not update the characteristic information according to the additional image data in the case of a corresponding unit cell.

Thereafter, when the user scans a predetermined point of the object in the third angle range, the resource density may be accumulated to a threshold resource density in the third angle range. For example, when the resource density of 100 is accumulated in the first angle range and the resource density of 100 is accumulated in the second angle range with respect to a predetermined unit cell, the resource density of 100 may be additionally accumulated in the third angle range with respect to the same unit cell, and thus, the resource density may be accumulated to a third reference (the resource density of 300 or the threshold final resource density). Likewise, even when additional image data is obtained in the third angle range after the resource density of 100 is additionally accumulated in the third angle range, the scanner 10 may not update the characteristic information according to the additional image data in the case of a corresponding unit cell.

It is described above that after the resource density may be accumulated to the first reference in the first angle range, the resource density may be accumulated to the second reference in the second angle range, and then, the resource density may be accumulated to the third reference (the threshold final resource density) in the third angle range. However, the scanning operation may not be necessarily performed in this manner. As another example, even when the resource density of 50 is accumulated in the first angle range, the resource density corresponding to the second angle range may be accumulated, when the scan angle of the scanner 10 is changed to the second angle range. For example, the resource density of 50 may be accumulated in the first angle range, the resource density of 80 may be accumulated in the second angle range, and the resource density of 70 may be accumulated in the third angle range. In this case, when the scanner 10 is positioned in the first angle range, the resource density of 50 may further be accumulated, when the scanner 10 is positioned in the second angle range, the resource density of 20 may further be accumulated, and when the scanner 10 is positioned in the third angle range, the resource density of 30 may further be accumulated. That is, with respect to the same point, the resource density may be accumulated separately for each angle range, and when a sufficient resource density is accumulated in each angle range, it may be determined that a corresponding unit cell may have high reliability. Consequently, an intraoral model having high reliability with respect to all unit cells by accumulating image data with respect to the same point in various angle ranges may be obtained.

In certain cases, when a sufficient resource density is accumulated in a predetermined angle range, but a sufficient resource density is not accumulated in another angle range, a requirement to perform the scanning operation at a different angle may be fed back to the user. For example, it may be assumed that the sufficient resource density is accumulated in the first angle range, and the sufficient resource density is not accumulated in the second angle range and the third angle range. Here, when the first angle range continues for a predetermined time period, the controller 20 described below may control the display 30 to output a notification message. For example, the notification message may be indicated as "please proceed with a scanning operation at a different angle by inclining the scanner." Alternatively, the notification message may display a roll-pitch-yaw direction for performing the scanning operation in different angle ranges as a sign or a sentence, in order to support a more effective scanning operation for the user.

The above descriptions are based on one angle element in a plan view, for example. However, according to the disclosure, an angle range may be set by comprehensively considering three angle elements based on the concept of a spherical cone and a spherical sector on a 3D space, and the accumulating of the resource density may be performed according to each angle range.

Also, as another example of the disclosure, the angle range may be flexibly set based on a relationship with a tooth surface, which is an object. For example, the scanner 10 may include a light projector configured to irradiate light in a predetermined form to the outside and a camera configured to receive light reflected from a surface of an object. Here, when the light irradiated from the light projector toward the object is reflected from the surface of the object and received by the camera, an angle formed by the surface of the object and the scanner 10 may be derived through the amount of received light. Light that is vertically incident to the surface of the object and vertically reflected may indicate the most clear image data with respect to a corresponding point. Thus, when the scanner 10 starts the scanning operation, the scan angle at which the amount of light received by the camera for a predetermined time period has the maximum value may be set as a reference angle (0, 0, 0). Also, the first angle range including the reference angle may be set to include a weight value so as to have a greater threshold resource density than other angle ranges. For example, when the threshold final resource density for a predetermined unit cell to have sufficiently reliability is 400, a threshold value of the resource density obtained in the first angle range may be 200, a threshold value of the resource density obtained in the second angle range may be 100, and a threshold value of the resource density obtained in the third angle range may be 100. Accordingly, a greater amount of image data may be accumulated in the first angle range than the other angle ranges, to further increase the reliability of the finally merged and generated intraoral model.

According to the size of the resource density and the angle range, update limit information may be additionally assigned to the characteristic information. That is, the information by which to determine to limit updating in the corresponding angle range when a reference resource density is reached in the same angle range may be assigned. Accordingly, the corresponding point determiner 25 may not identify the resource density whenever new real-time 3D surfaces are input and may only identify the update limit information in order to determine whether or not to update the characteristic information with respect to the corresponding unit cell. In the case of a unit cell to which the update limit information is assigned, data obtained from the scanner 10 may not be stored. The update limit information may be assigned when the resource density with respect to each angle range reaches the reference resource density, and when the scan angle of the data obtained from the scanner 10 includes the update limit information, it may be processed such that the characteristic information of the corresponding unit cell may not be updated.

Figure 9:
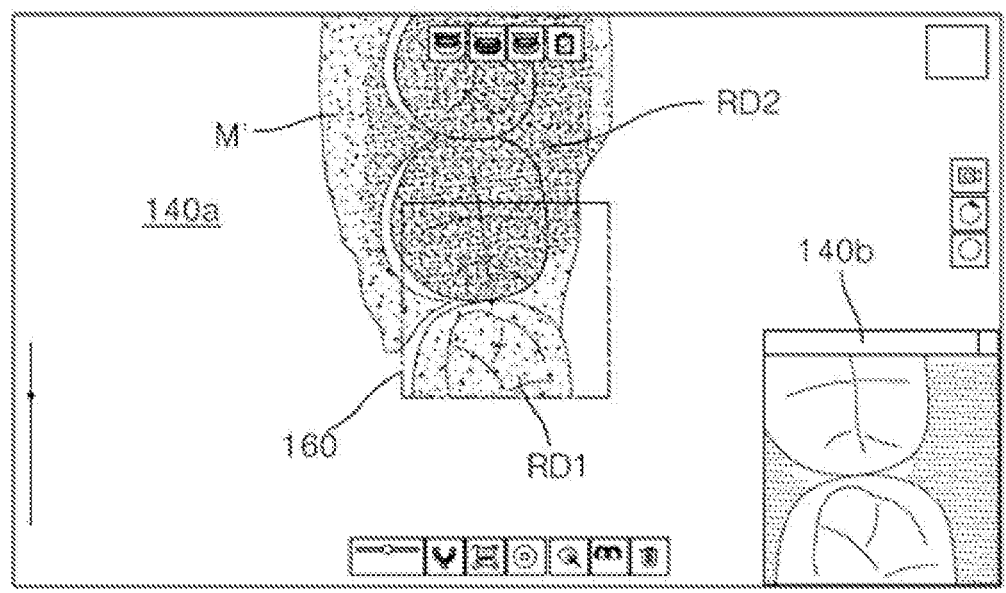
FIGS. 9 and 10 are reference diagrams for showing real-time three-dimensional surfaces generated and displayed, according to a scanning operation of a scanner, on a user interface displayed on a display, in order to describe a reliability data obtaining system according to the disclosure.
Figure 10:
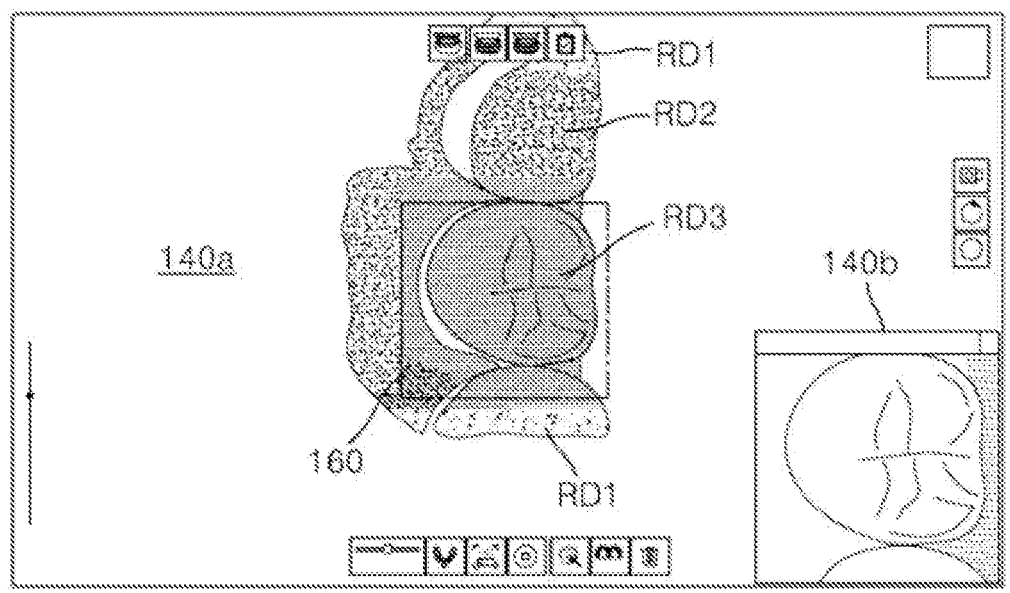

FIGS. 9 and 10 are reference diagrams for showing real-time 3D surfaces generated and displayed, according to a scanning operation of a scanner, on a user interface displayed on a display, in order to describe a reliability data obtaining system according to the disclosure.

Referring to FIG. 9, data obtained from the scanner 10 may be converted into the real-time 3D surfaces by a 3D data generator 21 of the controller 20 and may be displayed ton the display 30 electrically communication-connected with the controller 20. The display 30 may include any type of device through which a practitioner may visually recognize a scanning process. Desirably, a liquid crystal display (LCD) monitor, a table panel, etc. may be implemented.

When the scanning process is performed, real-time 3D surfaces M' may be displayed on a model display area 140*a* on the user interface, a central portion of the user interface may indicate a scan area 160 which is scanned in real time by the scanner 10, and image information obtained by a camera of the scanner 10 may be displayed on a real time display area 140*b*. Before the scanner 10 performs a scanning operation on the object M, the model display area 140*a* may be formed as a blank, and when the object M is started to be scanned by performing the scanning operation, the real-time 3D surfaces may be generated according to data that is input, and positions between the real-time 3D surfaces may be aligned. Here, a method of aligning the positions between the real-time 3D surfaces may include an ICP method as described above, or the aligning may be performed according to a scan angle and position information obtained from a movement distance and a movement angle obtained from a gyro sensor included in the scanner 10.

When the real-time 3D surfaces are aligned, characteristic information of a corresponding unit cell may be identified, and the characteristic information of the unit cell may be selectively updated. First, a resource density of the real-time 3D surfaces obtained in a first angle range may be accumulated to a maximum first reference resource density. When real-time 3D surfaces are obtained by the scanner 10 in a second angel range that is new, the characteristic information may be updated to be added so that the data may be accumulated to an extent greater than or equal to the first reference resource density. As described above, when the data is sufficiently accumulated at various angles, it may be determined that the resource density has reached a threshold value, and the additional updating of the characteristic information may be limited in the corresponding unit cell.

As illustrated in FIGS. 9 and 10, different reliability colors may be assigned so as to be differently displayed on the display 30 for a practitioner, according to the size of the resource density. For example, when the resource density assigned to the unit cell is less than a first reference resource density, a first reliability color RD1 may be assigned, and the corresponding unit cell may be displayed in the color. Also, when the resource density assigned to the unit cell is greater than or equal to the first reference resource density and less than a second reference resource density, a second reliability color RD2 may be assigned, and when the resource density assigned to the unit cell reaches the second reference resource density, a third reliability color RD3 (a threshold color) may be assigned. It may be determined that the unit cell to which the third reliability color RD3 is assigned may be sufficiently scanned. Here, the first reliability color RD1 may be red, the second reliability color RD2 may be yellow, and the third reliability color RD3 may be green.

However, although the reliability color corresponds the resource density, the reliability color may not directly correspond to an angle range. For example, when an arbitrary unit cell has the resource density of 50 in a first angle range and the resource density of 51 in a second angle range so that the unit cell may reach the first reference resource density by summing the resource densities, the second reliability color RD2 may be assigned to the unit cell. However, when for an arbitrary unit cell, a scan operation is not performed in another angle range, even when the arbitrary unit cell has a sufficient resource density in the first angle range, the reliability color may not proceed from red to yellow or from yellow to green. Thus, it is clear that a user may have to scan an object at multi-angles, in order to have the reliability color of all unit cells as the third reliability color RD3, that is, green.

In this specification, it is described that there are three reliability colors. However, the disclosure is not limited thereto, and the disclosure may be configured such that at least one reliability color may be assigned to correspond to a size of the resource density. Also, to display the reliability, a plurality of different patterns may be used, in addition to the colors. A practitioner may visually recognize the reliability color of the unit cells included in the real-time 3D surfaces, displayed on the display 30, and thus, may perform an additional scanning operation on a portion with respect to which the threshold color is not displayed, to obtain an intraoral model having generally high reliability. In order to obtain the highly reliable intraoral model, the object may have to be scanned at multi-angles.

Also, characteristic information assigned to the unit cells included in the real-time 3D surfaces may be stored in a storage 40 formed in the reliability data obtaining system according to the disclosure, and according to the characteristic information accumulated in the storage 40, a highly reliable intraoral model may be obtained. Also, the characteristic information may be selectively updated according to the angle range and the size of the resource density, so that unnecessary wastes of space of the storage 40 may be prevented.

Hereinafter, a reliability data obtaining method according to the disclosure is to be described. In describing the reliability data obtaining method, aspects that are the same as the aspects described with reference to the reliability data obtaining system are to be briefly mentioned or omitted.

Figure 11:
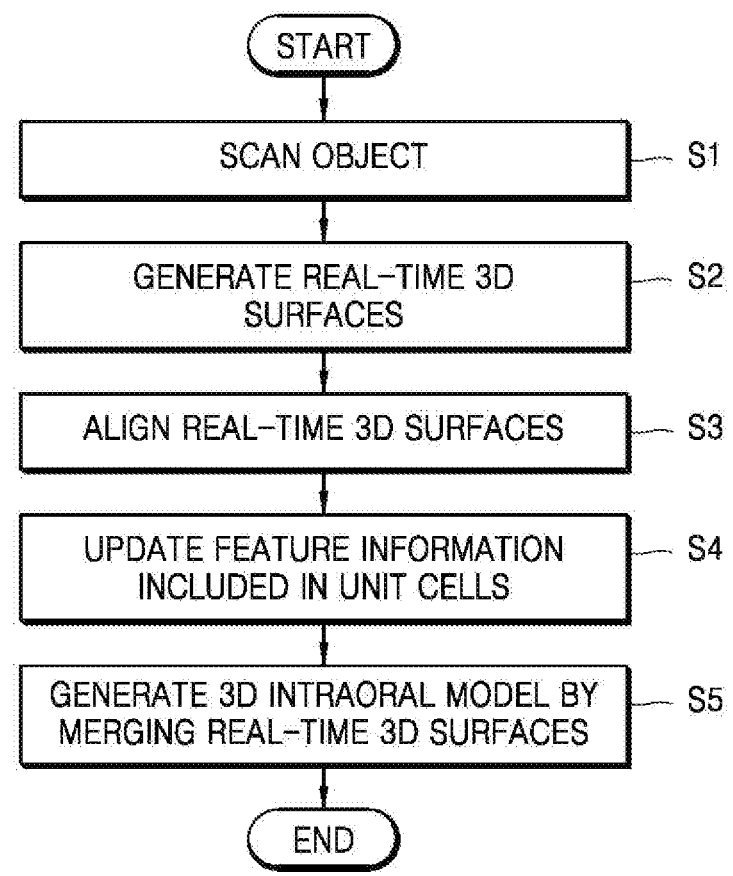
FIG. 11 is a flowchart of a reliability data obtaining method according to the disclosure.

FIG. 11 is a flowchart of a reliability data obtaining method according to the disclosure.

Referring to FIG. 11, the reliability data obtaining method according to the disclosure may include a scanning operation S1 in which light reflected from an object to be scanned by a scanner is received in two or more angle ranges, a real-time 3D surfaces generation operation S2 in which image data obtained by the light received in the scanning operation S1 is converted into real-time 3D surfaces including one or more unit cells, and an aligning operation S3 in which overlapping unit cells of the real-time 3D surfaces are aligned.

In the scanning operation S1, the scanner may be oriented at various angles with respect to the object to be scanned, and the scan angle may be divided into two or more angle ranges. Here, the scanner may be a hand-held scanner or a table scanner. The object to be scanned may be an actual oral cavity of a patient to be treated, but the object may also be a plaster model obtained via impression taking. The object may be received, through reflection of natural light, by a lens of at least one camera in the scanner. However, desirably, in order to convert the image data obtained with respect to the object into real-time 3D surfaces, a predetermined form of light may be irradiated by a light projector in the scanner toward the object, and light reflected from the object may be received. Here, the light irradiated from the light projector may be structure light, and desirably, may be light having a wavelength in a visible ray band.

The real-time 3D surfaces generation operation S2 may include converting the image data obtained in the scanning operation S1 into the real-time 3D surfaces having surface information. As described above, the structure light may be irradiated toward the object, the reflected light may be received by the lens of the at least one camera provided in the scanner, and the reflected light may be converted into the real-time 3D surfaces through an imaging sensor electrically communication-connected with the camera. The imaging sensor may include any type of device capable of converting 2D image data into real-time 3D surfaces. However, desirably, a CMOS sensor may be used. The real-time 3D surfaces may include one or more unit cells, and each unit cell may have characteristic information corresponding to a corresponding position. As described above, the characteristic information may include position information, a scan angle, a curve, a resource density, an object color, a reliability color, etc. with respect to the corresponding position.

When shots of the plurality of real-time 3D surfaces are generated in the real-time 3D surfaces generation operation S2 describe above, the aligning operation S3 in which the unit cells included in the real-time 3D surfaces are aligned to have overlapping positions may be performed. The aligning operation S3 may be performed such that the characteristic information with respect to the overlapping unit cells may be accumulated by connecting the real-time 3D surfaces, and the real-time 3D surfaces may be finally merged to be an intraoral model.

With respect to the unit cells of the real-time 3D surfaces, aligned in the aligning operation S3, a characteristic information updating operation S4 may include identifying the characteristic information assigned to the unit cells and selectively updating the characteristic information of a corresponding unit cell according to whether or not the characteristic information meets a threshold condition. To selectively update the characteristic information of the unit cells may denote that, for a unit cell having high reliability because sufficient data is already obtained, it may be determined that additional inputting of data is not required, and the characteristic information is not updated, and for a unit cell for which sufficient data is not yet obtained, the characteristic information is updated.

Here, the characteristic information assigned to the unit cell may include at least one of position information indicating a position of the unit cell, a scan angle indicating an angle, a resource density indicating a degree of resource accumulation, an object color indicating a color of an object, a curve indicating protrusion information of a surface of the object, and reliability color indicating a degree of reliability of data. In particular, the resource density indicates the degree of resource accumulation, and as the resource density increases, the unit cell may have increased reliability.

Figure 12:
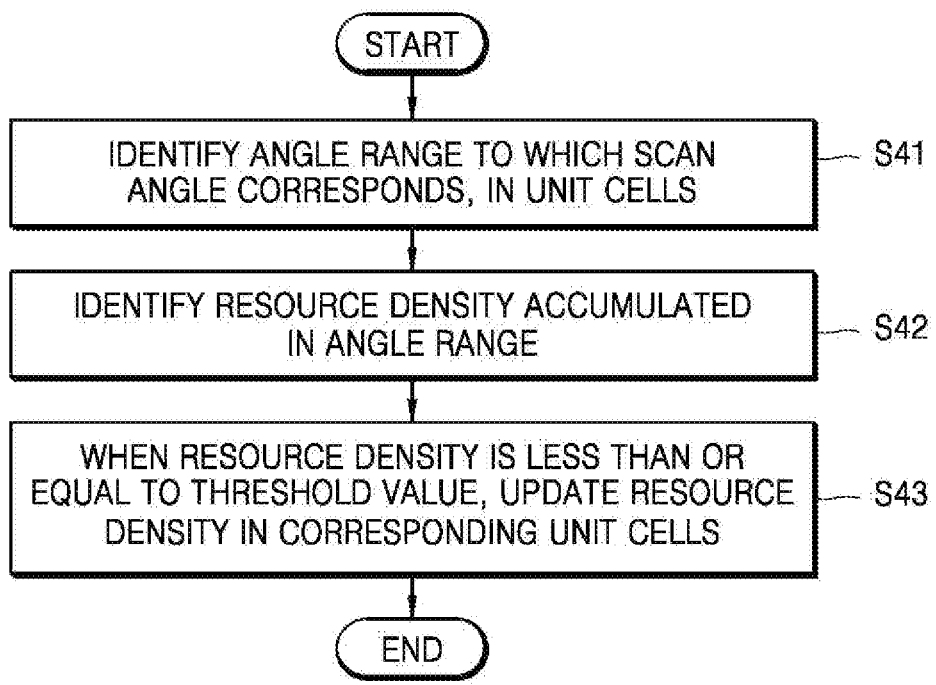
FIG. 12 is a flowchart of an operation of determining a threshold condition of a corresponding point in a reliability data obtaining method according to the disclosure.

FIG. 12 is a flowchart of an operation of determining a threshold condition of a corresponding point, in the reliability data obtaining method according to the disclosure.

Referring to FIG. 12, the characteristic information updating operation S4 is to be described in more detail. First, the characteristic information updating operation S4 may include identifying the characteristic information assigned to each aligned unit cell included in the real-time 3D surfaces. Here, the characteristic information to be identified may include various types of information, but may include an angle range identifying operation S41 in which the angle range to which the scan angle of the scanner corresponds may be first identified. That is, it may be identified in which category of the angle range, the scan angle according to the current scanning state of the scanner may be accumulated. With respect to the angle range, a reference angle may be defined based on a starting point of the scanning operation, and the angle ranges may be symmetrically formed based on the reference angle. The angle ranges may be formed to be classified into at least two, and each angle range may be predetermined to have a threshold resource density to the extent of which data may be accumulated. For example, when the scan angle has a first angle range and a second angle range, the threshold resource density of the first angle range may be 100, and the threshold resource density of the second angle range may be 100. That is, in one unit cell, the resource density may be accumulated through the two angle ranges (the first angle range and the second angle range), and a threshold resource density to the extent of which data may be accumulated in one unit cell may be 200.

After the angle range identifying operation S41, a resource density identifying operation S42 in which a size of the resource density accumulated in a corresponding angle range is identified may be performed. Here, when the size of the resource density assigned to a corresponding angle range of a unit cell is less than a threshold value, a characteristic information adding operation S43 in which the characteristic information is updated to add the resource density in the corresponding unit cell may be performed. Also, when the size of the resource density assigned to the angle range corresponds to the threshold value, updating may be limited so as not to add the resource density with respect to the corresponding unit cell. Accordingly, additional characteristic information may not be input with respect to the unit cell already having a sufficient resource density, and thus, the waste of a system resource may be prevented, and an intraoral model having high reliability may be obtained.

With respect to the scan angle described above, an angle at the starting point of the scanning operation may be defined as the reference angle, and the scan angle may include a first angle element including a first rotation direction L rotating based on an x axis, a second angle element including a second rotation direction E rotating based on a y axis, and a third angle element including a third rotation direction rotating based on a z axis, based on an orthogonal coordinate system. The first angle element and the second angle element may denote certain parts of a roll-pitch-yaw with respect to a rotation of an object. Desirably, the first angle element may correspond to a roll, and the second angle element may correspond to a pitch. Among this, at least two angle elements including the first angle element and the second angle element may be used to measure the scan angle. A movement distance and a movement angle of the scanner performing the scanning operation S1 may be obtained by a gyro sensor included in the scanner. For example, a 6-axis gyro sensor may be used.

The reliability color including at least two colors may be assigned to each unit cell according to the size of the resource density. Based on this configuration, a practitioner may easily identify which portions of the real-time 3D surfaces are insufficiently scanned, when the real-time 3D surfaces are displayed on a screen (the display), and may perform an additional scanning operation on the unit cells insufficiently scanned. The reliability color may be sequentially assigned in an order of red, yellow, green, etc. according to the size of the resource density. This may denote that, when a threshold resource density is set according to the angle range as described above, highly reliable data may be obtained only when thorough scanning in various angle ranges is performed on a corresponding unit cell point. By accumulating the resource density by performing the scanning operation in various angle ranges, the reliability of the characteristic information assigned to each unit cell may be increased, the data distortion may be prevented.

When highly reliable data is formed through the operations described above, a merging operation S5 in which the real-time 3D surfaces are merged to generate a 3D intraoral model may be performed, and a final intraoral model may be formed. As a result, the intraoral model having generally high reliability may be obtained.

All processes of the reliability data obtaining system and the reliability data obtaining method according to the disclosure described above may be performed based on the unit cell. By updating the characteristic information according to the angle range based on the unit cell, the calculation process may become simplified and more intuitive, compared to a previous configuration of updating data via grouping based on scan areas. Thus, system resources may be efficiently used, and as a result, a highly reliable 3D intraoral model may be rapidly obtained in order to provide precise prosthetic treatment to a patient.

The descriptions described above are only to convey the technical concept of the disclosure by using examples, and various changes and modifications may be possible by one of ordinary skill in the art within a range not deviating from essential configurations of the disclosure.

Therefore, embodiments described in the disclosure are given to explain the technical concept of the disclosure, rather than to limit the technical concept, and the embodiments do not limit the scope of the technical concept of the disclosure. The protection scope of the disclosure shall be interpreted based on the following claims, and all technical concepts within a range equivalent thereto shall be interpreted as being included in the claims of the disclosure.

INDUSTRIAL APPLICABILITY

The disclosure provides a reliability data obtaining system using multi-angle scanning configured to scan an object at multi-angles in order to obtain an intraoral model having generally high reliability and a method using the system.

The invention claimed is:

1. A reliability data obtaining system comprising:
a controller configured to process a plurality of pieces of data obtained from the light received by a scanner to be displayed on a user interface as real-time three-dimensional (3D) surfaces and change characteristics of the real-time 3D surfaces according to a scan angle of the real-time 3D surfaces,
wherein the real-time 3D surfaces comprise one or more unit cells, and characteristics of the real-time 3D surfaces comprise a resource density of each of a plurality of angle ranges of the each of the unit cells,
wherein the resource density indicates a data accumulation degree, and
wherein, when a scan angle at which the scanner scans an object corresponds to a predetermined angle range, and the resource density of the predetermined angle range of the corresponding unit cell corresponds to a threshold value determined for the angle range, the data obtained from the scanner is not stored in the corresponding unit cell.

2. The reliability data obtaining system of claim 1, wherein the controller is further configured to generate a 3D intraoral model by merging the real-time 3D surfaces.

3. The reliability data obtaining system of claim 1, wherein the controller comprises:
a 3D data generator configured to convert the data obtained from the scanner into a form of the real-time 3D surfaces;
an aligner configured to align the real-time 3D surfaces;
a characteristic assigner configured to assign characteristic information to the real-time 3D surfaces; and
a scan angle calculator configured to calculate the scan angle.

4. The reliability data obtaining system of claim 1, wherein the unit cells are a voxel having a volume, and the unit cells comprise at least one from the characteristic information comprising, a curve, an object color, a reliability color, and position information.

5. The reliability data obtaining system of claim 4, wherein the scan angle calculator is further configured to calculate a movement distance and a movement angle from a coordinate deviation of the scanner.

6. The reliability data obtaining system of claim 5, wherein the scan angle comprises at least two angle elements comprising a first rotation direction and a second rotation direction.

7. The reliability data obtaining system of claim 6, wherein the movement distance is represented in a form of an orthogonal coordinate system.

8. The reliability data obtaining system of claim 7, wherein the controller further comprises a corresponding point determiner configured to determine, with respect to the unit cells of the aligned real-time 3D surfaces, whether or not the characteristic information is less than a threshold value, and selectively update the characteristic information of the unit cells.

9. The reliability data obtaining system of claim 8, wherein the corresponding point determiner is configured to identify the characteristic information of the unit cells corresponding to parts of the real-time 3D surfaces, the parts being aligned to overlap each other.

10. The reliability data obtaining system of claim 9, wherein the characteristic information identified by the corresponding point determiner corresponds to at least one of the resource density or the scan angle.

11. The reliability data obtaining system of claim 4, wherein, when a scan angle at which the scanner scans the object corresponds to a predetermined angle range, and the resource density of the predetermined angle range of the corresponding unit cell corresponds to a threshold value determined for the angle range, the characteristic assigner is further configured to assign update limit information the corresponding unit cells.

12. The reliability data obtaining system of claim 11, wherein, the corresponding point determiner is configured not to store the data obtained from the scanner in the unit cell to which the update limit information is assigned.

13. A reliability data obtaining method comprising:
a scanning operation in which at least one piece of image data is, at different angles, obtained from an object to be scanned by a scanner;

a real-time three-dimensional (3D) surfaces generating operation in which the image data obtained in the scanning operation is converted into a form of real-time 3D surfaces;

an aligning operation in which the real-time 3D surfaces are aligned; and a characteristic information updating operation in which characteristic information assigned to the real-time 3D surfaces is identified, and according to whether or not the characteristic information corresponds to a threshold condition, the characteristic information of the real-time 3D surfaces is selectively updated, wherein the real-time 3D surfaces comprise one or more unit cells, and characteristics of the real-time 3D surfaces comprise a resource density of each of a plurality of angle ranges of the each of the unit cells, wherein the resource density indicates a data accumulation degree, and wherein, when a scan angle at which the scanner scans the object corresponds to a predetermined angle range, and the resource density of the predetermined angle range of the corresponding unit cell corresponds to a threshold value determined for the angle range, the data obtained from the scanner is not stored in the corresponding unit cell.

14. The reliability data obtaining method of claim 13, wherein the characteristic information is assigned to the unit cells, wherein the characteristic information comprises at least one of position information, a scan angle, an object color, a curve, and a reliability color.

15. The reliability data obtaining method of claim 14, wherein the characteristic information updating operation comprises, with respect to the unit cells, an angle range identifying operation in which an angle range to which the scan angle corresponds is identified;

a resource density identifying operation in which the resource density accumulated in the angle range is identified; and a characteristic information adding operation in which, when the resource density is less than a threshold value, the resource density is updated with respect to the corresponding unit cells.

16. The reliability data obtaining method of claim 15, wherein the scan angle is obtained by applying a movement angle based on a point at which the scanning operation is started, and the movement angle has at least two angle elements including a first rotation direction and a second rotation direction.

* * * * *